United States Patent [19]

Griffith

[11] Patent Number: 4,559,437
[45] Date of Patent: Dec. 17, 1985

[54] AIR ASSISTED HAND HELD WELDING TOOL

[75] Inventor: Joseph W. Griffith, Portland, Oreg.

[73] Assignee: Tektronix, Inc., Beaverton, Oreg.

[21] Appl. No.: 646,882

[22] Filed: Sep. 4, 1984

[51] Int. Cl.[4] .................. B23K 11/10; B23K 11/28
[52] U.S. Cl. ............................ 219/86.21; 219/89; 219/234; 219/85 F
[58] Field of Search .............. 219/86.21, 86.22, 86.23, 219/89, 90, 56.1, 85 F, 234, 85 CA

[56] References Cited

U.S. PATENT DOCUMENTS

| | | | |
|---|---|---|---|
| 2,839,665 | 6/1958 | Wolfbauer | 219/89 |
| 2,882,386 | 4/1959 | Hermanny | 219/90 |
| 3,396,261 | 8/1968 | Kirsch | 219/89 |
| 3,752,017 | 8/1973 | Lloyd et al. | 219/234 X |

FOREIGN PATENT DOCUMENTS 14481 1/1982 Japan .................................. 219/89

Primary Examiner—C. L. Albritton
Assistant Examiner—Catherine H. Sigda
Attorney, Agent, or Firm—John D. Winkelman; Robert L. Harrington

[57] ABSTRACT

An air assisted hand welding tool for clamping and welding conductors together. The tool includes a handle formed of pivotally connected lever-like members. An air passage is connected to an air pressure source provided in the handle of the hand tool. A valve is manually engaged by the operator (following tactile closing of the electrodes on the conductors) to open the air pressure to an expansion chamber formed between the members. As the chamber pressure is increased, the members are urged to a consistent clamping force thereby to assist the operators normal hand clamping function. A switch in the expansion chamber is connected to the welding circuit and is activated following chamber expansion to initiate welding. The entire welding operation including air assist and welding current initiation are all accomplished by a simple closing motion of the operators hand.

11 Claims, 8 Drawing Figures

AIR ASSISTED HAND HELD WELDING TOOL

FIELD OF INVENTION

This invention relates to a hand held welding tool including electrode fingers that clamp onto selected elements for welding the elements together in a resistance welding operation, and more particularly to the means for producing sufficient clamping force of the electrode fingers in preparation for welding.

BACKGROUND OF INVENTION

This invention is particularly designed for and specifically applicable to hand held welding tools used for delicate welding jobs in a manufacturing operation. An example of such a tool is one used in welding elements such as a wire conductor to a pin conductor mounted on the inside wall of a cathode ray tube. The tool includes a pair of members (which form a hand grip for the operator) that are pivotally joined near one end with the other end (hereafter free end) having the members biased apart. The free end of the tool controls a pair of electrode fingers. An operator simply positions the wire and pin to be welded together between the electrode fingers (using the tool like a "tweezers") by squeezing the electrode fingers together. When the elements are properly clamped together, they are ready for welding and the operator initiates a welding current through the eletrodes to achieve the desired weld.

It has been found that about 5 or more pounds of squeezing force is necessary to insure a secure weld. Thus the necessary squeezing force should be applied before a switch is closed to send the welding current through the electrodes and the squeezing force must be maintained during the brief period of welding. The hand tool briefly described is capable of producing the desired weld. However, an operator of the tool in an assembly line type of production may be required to complete hundreds of welds in a single day. Fatigue alone will cause the operator to reduce the applied squeezing force below the required 5 or more pounds and thereby create bad welds.

The effect of fatigue in the production of inconsistent welds has been recognized heretofore, and a solution that has been posed is to provide air pressure assistance. Thus an air cylinder has been connected to the hand tool to assist in generating an adequate squeezing force. The typical design of air assisted tools, prior to this invention includes the air cylinder with an air hose running from the tool to a remote solenoid operated air valve attached to a source of air pressure. An electric switch is incorporated in the tool handle to trigger the air solenoid valve. Another electrical switch is foot operated to initiate the flow of welding current.

A typical operation for such an air assisted welding tool involves trapping the two parts to be welded between the electrodes by manually squeezing the handles of the tool, then energizing the air solenoid valve by closing the switch on the tool handle, e.g. by squeezing hard on the handle, and finally initiating the electrical current flow by stepping upon a foot switch. As the air solenoid valve is energized, the air flows through the hose and into the cylinder causing the electrodes to exert the proper clamping force. Only then should the foot switch initiate current flow. Since the air hose has enough length and is of a sufficiently small diameter (in order to be adequately flexible) a considerable time elaspes between the closing of the switch on the tool handle and the development of the proper clamping force. Operators will frequently step on the foot switch before the required time elapse and thus before the air hose is completely pressurized. An electrical current flow thus initiated prior to adequate clamping force causes defective welds.

Another design for an air assisted weld tool provides two air operated electrodes that are either opened or closed by air pressure. It is not possible to trap the two parts between the electrodes by manual squeezing of the handles of this design. An electrical switch is closed and full clamping force is applied by the electrodes as soon as the air travels through the air hose. As the air is going through the air hose, an electrical timer runs which causes the weld current to flow as it "times out". This length of time is typically great enough so that the operator will, on occasion, inadvertently release the solenoid air valve before welding has been completed. This reduction of the clamping force as the electrical energy heats the parts will again create a defective weld.

PRESENT INVENTION

The present invention provides tactile feed back of manual operation plus consistant welds derived from an air assisted clamping of the electrodes onto the elements and triggering of the flow of electrical current for welding only when adequate cylinder pressure has been achieved. The sequence of these three actions is accomplished under complete operator control while the operator concentrates on one hand (no feet) operation.

In brief, the preferred hand tool of this invention includes hinge connected members similar to the prior hand tools, with the pivot being slightly inward of the extreme ends so that spreading of the extreme ends produces closing of the electrode bearing free ends of the members. An expansion chamber is provided between the extreme ends, as defined by a cylinder and a piston movable within the cylinder. An air line is connected to the air chamber (through air passages in one of the members) and an air valve is positioned to be activated by the operators thumb i.e., closely adjacent to the expansion chamber. A weld initiating switch is positioned in the air chamber to be automatically activated upon expansion of the chamber.

In operation, the operator manually squeezes the members together so as to trap the elements between the electrodes. The thumb is then flexed forward onto the air valve to release air pressure into the chamber. Upon expansion of the chamber (and thus exertion of air assisted clamping force on the electrode fingers) the weld initiating switch is activated and the elements are welded together. The result is a tool that is almost effortless to use due to elimination of the high squeezing force requirement and elimination of the multiple step operation. This generates a reliable repetition of secure welds in a typical assembly line production.

DETAILED DESCRIPTION AND DRAWINGS

A more complete understanding of the invention will be obtained by reference to the following detailed description and drawings wherein.

Figure 1:
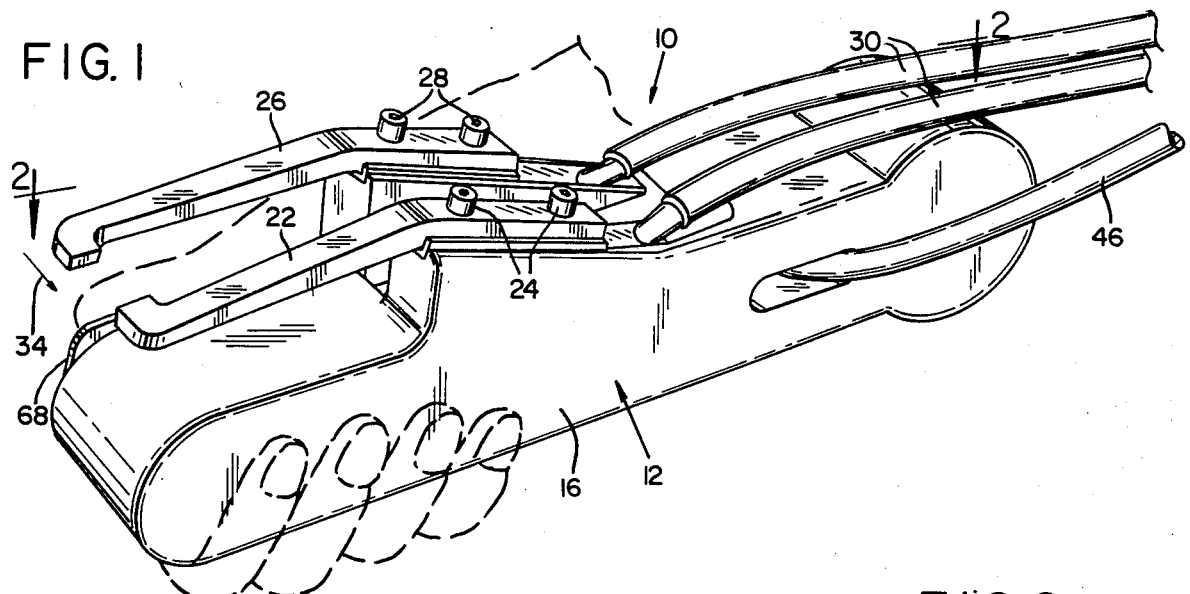
FIG. 1 is a prespective view of a hand tool incorporating the present invention.
Figure 2:
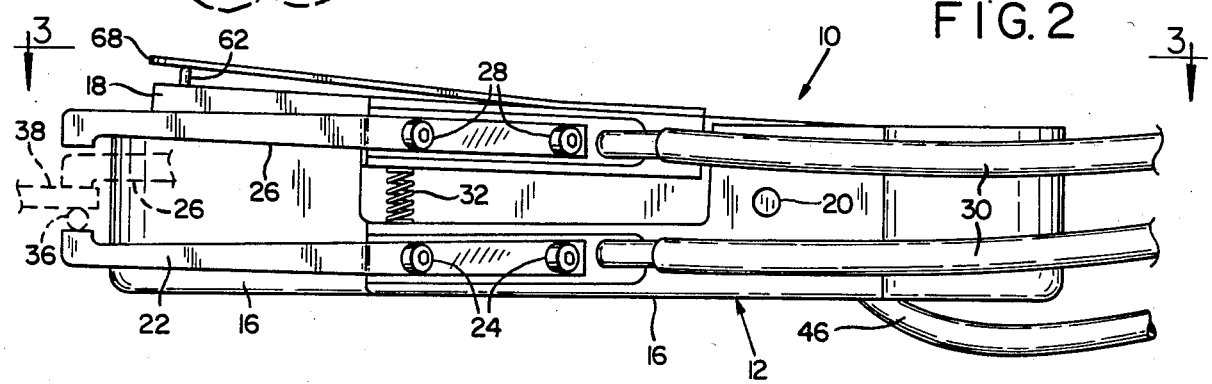
FIG. 2 is an end view of the hand tool as taken on view lines 2—2 of FIG. 1.
Figure 3:
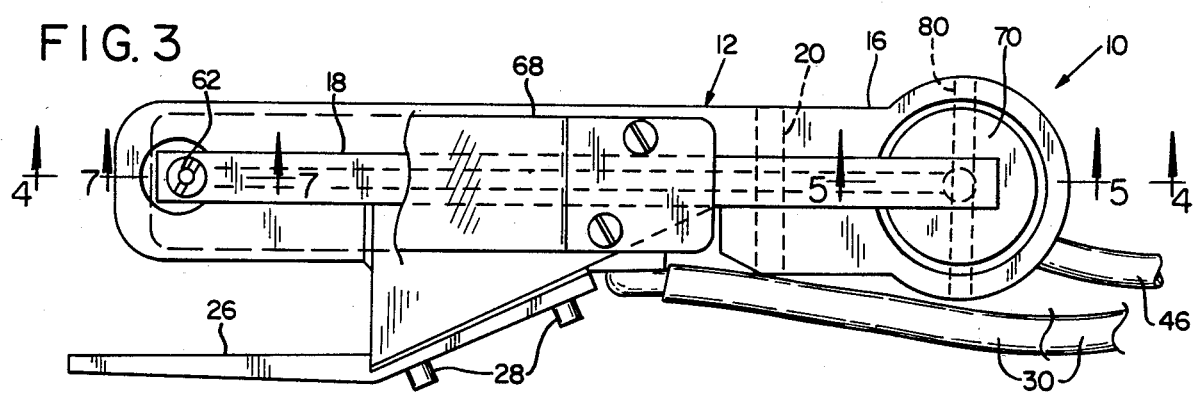
FIG. 3 is a side view of the hand tool as taken on view lines 3—3 of FIG. 2 but showing portions thereof removed.

Referring to FIGS. 1 and 2 of the drawings, a welding hand tool 10 includes a hand grip 12 designed to be held in an operators hand (shown in dash lines in FIG. 1 only). The hand grip 12 includes an outer lever-like member 16 that forms a partial shell around an inner lever-like member 18. The outer and inner members are pivotally connected together near one end by a pivot pin 20.

A first electrode finger 22 is mounted to the outer member 16 (by screws 24) and a second electrode finger 26 is mounted to the inner member 18 (by screws 28). The free ends of the inner and outer members, opposite pivot pin 20, are thus adapted to be pivoted toward and away from each other and the electrode fingers 22 and 26 are similarly pivoted toward and away from each other. A coil spring 32 urges the members apart whereas forcing the members together is accomplished, in part, by the operator closing his hand, e.g. with the thumb pressing against the inner member 18 while the fingers hold the outer member 16 (see FIG. 1 where arrow 34 illustrates the force applied by the operator's thumb).

It will be appreciated that the electrode fingers 22 and 26 are connected to the electrical conductors 30. The normal operation of the tool involves manual positioning a pin 36 and conductor 38 between the electrode fingers (as shown in dash lines in FIG. 2), clamping the electrodes with sufficient force for secure welding and generating an electrical current through the electrodes to heat and partially melt the pin and conductor, thus resulting in a welding together of the conductor 38 and pin 36.

As previously explained, the clamping force 34 needs to be in the range of 5 or more pounds, and whereas this force can be generated by the operator for a number of welding operations, eventually the operator tires and the manual squeezing force decreases. Unless the pin and conductor are held tightly together, a dependable weld is not assured and a high percentage of welding failures will result. Thus the clamping force 34 is air assisted as will now be explained.

Figure 4:
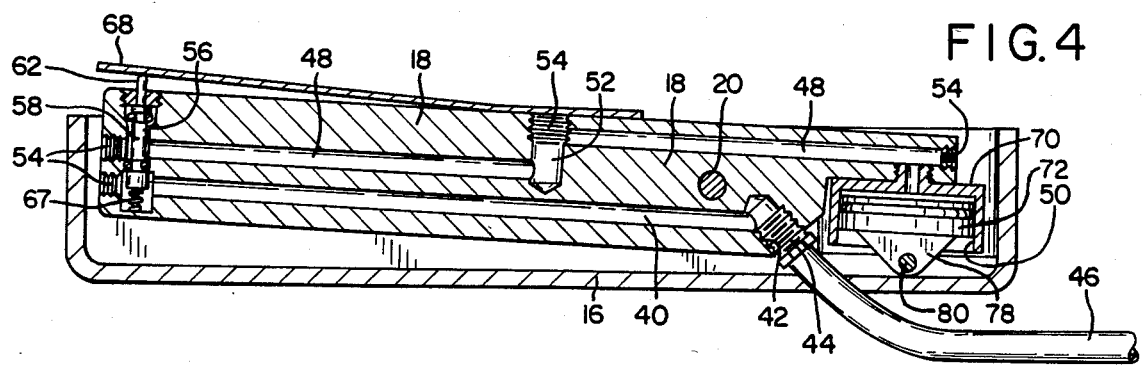
FIG. 4 is a sectional view of the hand tool as taken on view lines 4—4 of FIG. 3.

Referring to FIG. 4 of the drawings, the inner member 18 is provided with an internal air passage 40 with a threaded coupling inlet 42 that receives the coupling 44 of air line 46. The coupling inlet 42 is located at about the pivotal connection and opens to the side that faces member 16 (the air line 46 is threaded through an opening in member 16). The air passage 40 is provided adjacent the same side within member 18 and extends from the coupling inlet 42 to the extreme free end of the member. A second air passage 48, offset from the first air passage 40 toward the side opposite member 16, extends from the free end of member 18 back to the extreme opposite end. A chamber 50 is connected to the air passage 48 and is formed between the extreme ends of the inner and outer members (beyond the connection of pivot pin 20). The air passage 48 is provided in two sections with the first section closely adjacent to the air passage 40 and the second section further offset and closely adjacent to the said opposite side so as to accommodate the chamber 50. An interconnecting channel 52 interconnects the two sections of air passage 48. Plugs 54 are inserted at each exposed end of the passage 40, 48, and channel 52 (made necessary in the drilling of the air passages) to prevent unwanted air leakage.

Figure 7:
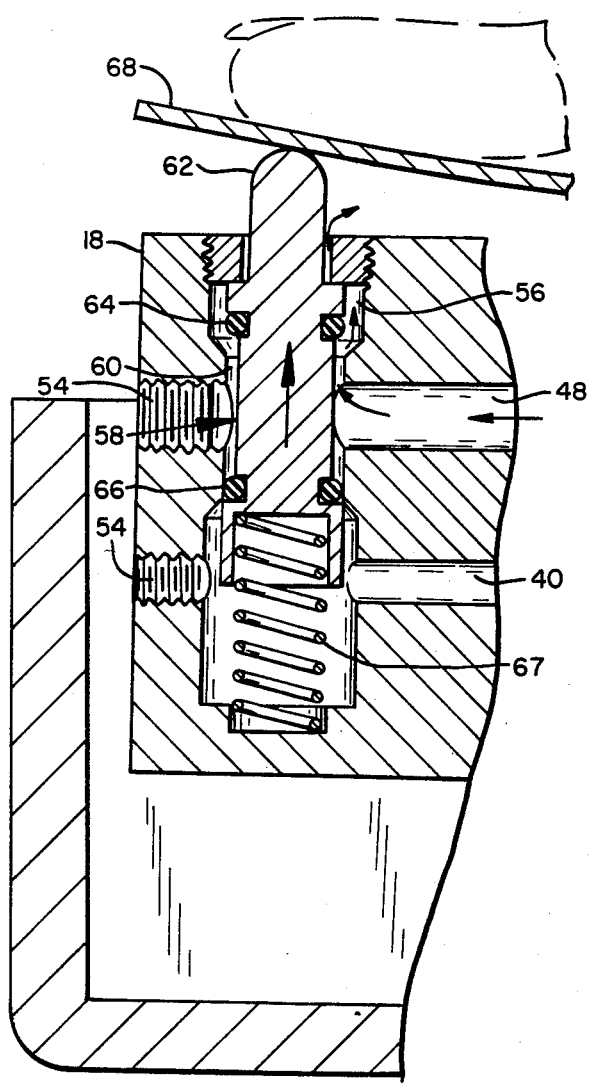
FIG. 7 is an enlarged view of a portion of the sectional view of FIG. 4 as taken on view lines 7—7 of FIG. 3.
Figure 8:
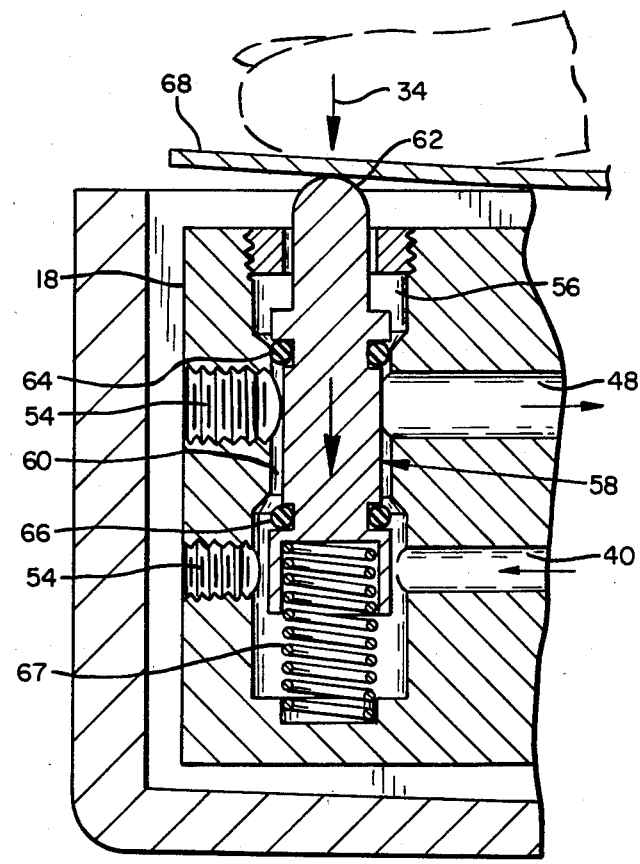
FIG. 8 is a view similar to FIG. 7 but showing a second position of the components thereof.

Referring now also to FIGS. 7 and 8, a valve channel 56 interconnects the passage 40 and 48. A movable shuttle valve 58 seated in the valve channel 56, functions to control air passage from passage 40 to passage 48 (see directional arrows in FIG. 8), and from passage 48 to the atmosphere (see directional arrows in FIG. 7). As seen in the drawings, channel 56 is formed with upper and lower enlarged areas interconnected by a narrower area referred to as the channel throat 60. The shuttle valve 58 includes a protruding valve stem 62, a first "O" ring 64 adapted to seal the throat passageway with the stem 62 depressed as seen in FIG. 8, and a second "O" ring 66 adapted to seal the throat passageway with the stem 62 extended as seen in FIG. 7. A spring 67 in the base of the valve stem 62 urges the valve stem to its extended position of FIG. 7.

Referring again to FIGS. 4, 7, and 8, in the "at rest position", air pressure from air line 46 is sealed in air passage 40 due to the blockage by the valve 58 i.e. the valve stem 62 is extended and "O" ring 66 is positioned in the throat 60. In this position, "O" ring 64 is located in the enlarged end area of the passage 56 and passage 48 is thus in communication with the atmosphere as indicated by the directional arrows in FIG. 7.

When it is desired to initiate a weld, the electrode fingers are fist closed on the pin and conductor, accomplished by the operator pressing against a flexible cover 68 with the base of his thumb as illustrated in dash lines in FIG. 7. When manual gripping of the elements is achieved, the thumb is flexed forwardly as illustrated in dash lines in FIG. 8. This moves the valve stem 62 into its depressed position in the channel as illustrated in FIG. 8.

During the process of depressing the valve stem 62, "O" ring 64 first seals off the throat 60 leading to the atmosphere (for an instant "O" rings 64 and 66 are both in sealing engagement in the throat) and subsequently "O" ring 66 is pushed into the lower enlarged area of channel 56 to open the throat 60 to air pressure in passage 40. Air from passage 40 passes into and through passageway 48 into the chamber 50. Release of the thumb plate by the operator returns the valve stem (urged by spring 67) to its extended position, first completely sealing the throat 60 and then opening the passageway 48 to the atmosphere to thereby bleed off air pressure from the chamber 50. The air chamber and its reaction to the air pressure changes will now be explained.

Figure 5:
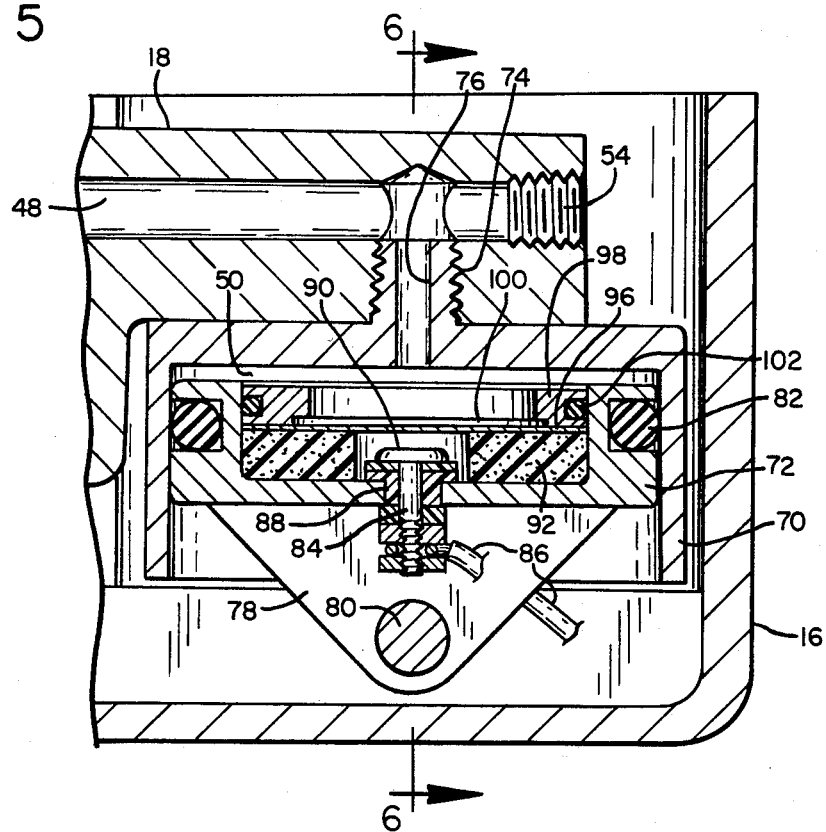
FIG. 5 is an enlarged view of a portion of the sectional view of FIG. 4, as taken on view lines 5—5 of FIG. 3.
Figure 6:
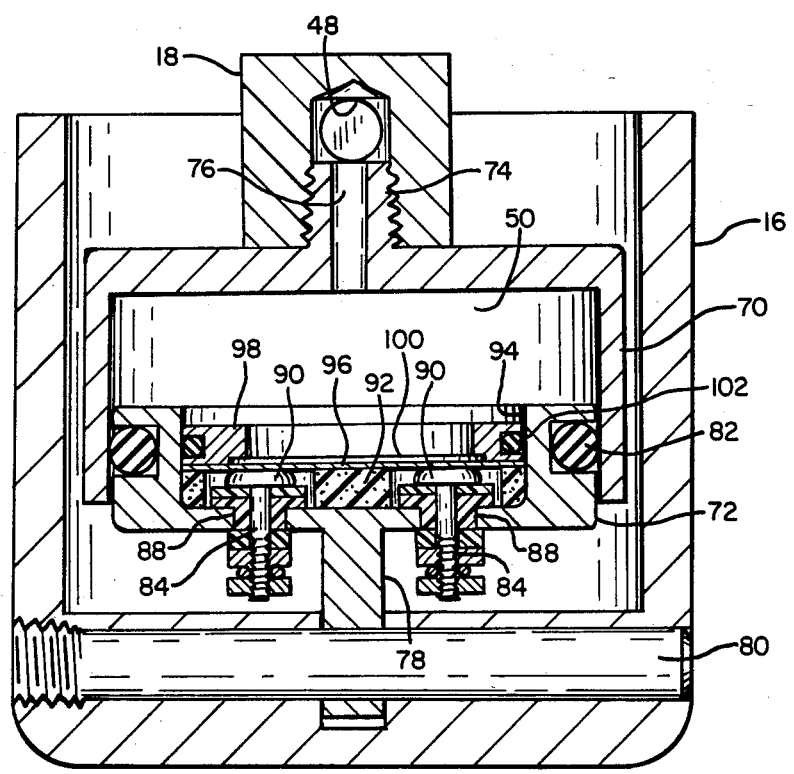
FIG. 6 is a sectional view as taken on view lines 6—6 of FIG. 5.

Reference is made to FIGS. 5 and 6 of the drawings illustrating the chamber 50 formed in the extreme end of the members 16 and 18. The chamber 50 is provided inside a cylinder 70 defined at one end by piston 72 movable in the cylinder. The cylinder 70 is anchored to member 18 by a stud portion 74 screwed into the member 18. A connecting channel 76 is provided in the stud portion and connects chamber 50 with air passageway 48. Piston 72 includes stem 78 that is pivotally connected by pivot pin 80 to the outer member 16. An "O" ring 82 seals off the chamber 50 around the piston 72 and thus, as air pressure in chamber 50 is increased, the chamber is urged to expand by relative outwardly directed movement of the piston and cylinder i.e. from the position of FIG. 5 to that of FIG. 6. This urges seperation of the extreme ends of the members 16 and 18 which urges closure of the free ends on the opposite side of the pivot 20 (see FIG. 4) and thus closure of the electrode fingers 22 and 26.

The piston 72 also includes a welding circuit completion switch. Referring again to FIGS. 5 and 6, a pair of contact pins 84 are connected by electrical conductors 86 to the welding circuit (not shown). It will be understood that conductively interconnecting the two pins 84 completes the welding circuit and initiates welding.

The pins 84 are mounted in the piston 72 (through insulator plugs 88) with their contact heads 90 normally recessed in an elastomeric pad 92 (FIG. 5). The pins 84 are adjustably mounted in pad 92, i.e. they can be screwed up or down within the insulator plugs 88. The elastomeric pad is seated in a secondary chamber 94 provided in the face of the piston. A thin metal plate 96 is provided over the elastomeric pad and thus normally suspended over contact heads 90. A containment ring 98 and cover 100 mounted over the metal plate 96, are adapted to slide up and down within the inner chamber 94 with "O" ring 102 sealing the periphery of the containment ring to avoid having air pressure leak around the edge of the ring and under the elastomeric pad.

It will be observed from comparison of FIGS. 5 and 6 that, with the air pressure in chamber 50 evacuated, the pressure in chamber 94 is similarly reduced and the pad 92 is allowed to expand whereby plate 96 is moved out of contact with contact heads 90. With increase of the air pressure in chamber 50, the pad 92 is compressed as shown in FIG. 6, and plate 96 is brought into contact with contact heads 90 to interconnect the heads conductively and initiate welding. It will be understood that adjustment of pins 84 within the pad 92 adjusts the air pressure point at which the plate 96 will contact the heads.

Operation

The operation of the hand welding tool with now be briefly summarized having reference to all of the drawings. In the at-rest position, the air pressure in chamber 50 is at atmospheric pressure, the electrode fingers 22 and 26 are seperated as shown in FIG. 1, and plate 96 is suspended or out-of-contact with the contact heads 90 of pins 84. The operator first positions the elements to be welded between the electrode fingers e.g. a pin and conductor as illustrated in dash lines in FIG. 2, and initiates closing of the electrode fingers by depressing the cover 68 with the base of his thumb (see FIG. 7). When the operator feels that he has appropriately trapped the elements between the electrodes, he flexes his thumb forward, as illustrated in FIG. 8, thereby to depress the valve stem 62. This depression of the valve stem 62 moves the stem from the position shown in FIG. 7 to that of FIG. 8. Thus air from passage 40 is open to passage 48 which in turn elevates the air pressure in chamber 50. The piston 72 is thus forced outwardly from the cylinder 70 and, because they are respectfully components of member 16 and 18, and because they are positioned rearwardly of pivot 20, the electrode fingers (located forwardly of pivot 20) are forceably clamped together onto the conductor and pin. As the pressure is sufficiently raised in chamber 50, (following extension of piston 72 in cylinder 70) the elastomeric pad 92 becomes sufficiently collapsed so that metal plate 96 contacts the heads 90 to complete the welding circuit and thus initiate welding of the conductor and pin. Release of the thumb allows the valve stem 62 to be returned by spring 68 whereby air pressure from passage 40 is cut off (by "O" ring 66) and passage 48 is opened to atmospheric pressure through channel 56. This reduces air pressure in chamber 50, disconnects the welding circuit, and allows opening of the electrode fingers (urged by spring 32).

Many modifications, changes, and improvements to the above described system will be apparent to those skilled in the art without departing from the invention. Exemplary of such a change is the replacement of the movable piston within chamber 50 with appropriate diaphragms. Also other valve structures are possible, it being important only to locate it for easy manipulation and close adjacency to the expansion chamber. Similarly the switch for initiating the welding circuit may be relocated. For example, a pressure sensitive switch can be placed adjacent the valve or at other points in the exhaust system where closing of the switch will take place only upon build up of pressure in the expansion chamber. Still further, the switch might be located for direct contact by the valve at a point after the valve has interconnected the air pressure inlet with the expansion chamber. Thus the invention is not limited to the embodiment illustrated and described but rather is encompassed by the claims appended hereto.

I claim:

1. A hand welding tool comprising; first and second members each having a front end and rear end, an electrode finger carried by each of said first and second members at the front ends thereof, pivotal connecting means pivotally interconnecting said first and second members spaced inwardly from said front end for relative pivoting of the front ends to pivot the electrode fingers toward and away from each other, and the improvement which comprises; first and second air passages in one of said members and coupling means for coupling the first air passage to an air pressure source, an expansion chamber formed between said members whereby expansion and deflation of the chamber urges pivoting of the members, means communicating said second air passages with said chamber, said first member having an air channel opening to the atmosphere and to the first and second passages, and a valve in said channel having a first position interconnecting the second passage to the atmosphere while sealing off the first passage, and a second position interconnecting the first and second passages while closing off the outlet to the atmosphere, and means for manual actuation of said valve from the first to the second positions.

2. A hand welding tool as defined in claim 1 including biasing means for biasing the electrode fingers apart in an at-rest position.

3. A hand welding tool as defined in claim 2 wherein the first and second members form a hand grip to be manually pivoted by an operator for tactile clamping of the electrode fingers onto conductors to be welded together prior to air assisted clamping.

4. A hand welding tool as defined in claim 3 wherein the pivot connection is positioned between the front and rear ends of the members with the electrode fingers and hand gripping position located forward of the pivot, and the expansion chamber located rearward of the pivot.

5. A hand welding tool as defined in claim 4 wherein the valve is a shuttle valve having a valve stem protruded to the exterior of the member to be depressed and thereby activated by an operators thumb, and spring means biasing the valve stem to its extended position.

6. A hand welding tool as defined in claim 3 including a welding circuit switch mounted in the hand piece, and means for automatic actuation of the switch to complete the circuit following air assisted clamping of the conductors by the electrodes.

7. A hand welding tool as defined in claim 6 wherein the switch includes a pair of electrical contacts mounted in the expansion chamber, said contacts connected to the welding circuit and adapted to complete the circuit when conductively interconnected, a conductive plate normally spaced from the contacts and adapted to engage said contacts for conductively interconnecting said contacts, and means responsive to an air pressure change in the air chamber to move the conductive plate into and out of engagement with the contacts.

8. A hand welding tool as defined in claim 7 wherein the air chamber includes a cylinder connected to one of said members and a piston movable in the cylinder and connected to the other member, said piston including a secondary chamber, an elastomeric pad is seated in the secondary chamber, the electrical contacts are recessed in the elastomeric pad and the conductive plate overlies the pad and normally spaced from the contacts, and means for pressing said plate into the elastomeric pad and into engagement with the contacts in response to an increase in air pressure in the chamber.

9. A system for resistance welding of electrical conductors comprising; a hand tool including a pair of lever members pivotally interconnected and adapted to be pivoted relative to each other upon the opening and closing of an operators hand around the hand tool, a pair of electrode fingers connected to a welding circuit and mounted one each on each of the lever members, said fingers adapted to be opened and closed on the conductors in a clamping and welding operation as the members are pivoted, and the improvement which comprises; an air pressure assist system including an expansion air chamber between the members for opening and closing the fingers in response to expansion and contraction of the air chamber, one of said lever members having an air passage into said chamber and connected to an air pressure source and valve means associated with said air passage for sealing off air pressure to said chamber in an at-rest-condition, said valve being manually activated to release air pressure to said chamber to expand the air chamber and assist in the clamping operation.

10. A system for resistance welding electrical conductors as defined in claim 9 including an electrical switch in said air chamber to be activated by air pressure expansion of said chamber to close the welding circuit and thereby initiate welding of the conductors.

11. A welding hand tool comprising; a pair of members pivotally connected together and forming a handle for manual manipulation of the members, electrodes attached to said members whereby relative pivotal movement of the members pivots the electrodes apart and together, air expansion means including air pressure inlet and air pressure exhaust for secondary pivoting of the members, said members being pivoted together when the expansion means is pressurized and apart when exhausted, a valve contained within one of said members and associated with said air pressure inlet and air pressure exhaust for controling pressurization and exhaust of said air expansion means, said valve being operable by one of an operator's fingers and thumb during manual manipulation of the members.

* * * * *